(12) United States Patent
Rollins

(10) Patent No.: US 7,605,934 B2
(45) Date of Patent: Oct. 20, 2009

(54) METHOD AND SYSTEM FOR FACSIMILE DELIVERY USING DIAL-UP MODEM POOLS

(75) Inventor: Doug Rollins, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 681 days.

(21) Appl. No.: 09/840,548

(22) Filed: Apr. 23, 2001

(65) Prior Publication Data

US 2002/0154341 A1 Oct. 24, 2002

(51) Int. Cl.
*G06F 3/12* (2006.01)

(52) U.S. Cl. ............... 358/1.15; 358/400; 358/403; 358/404; 358/405; 358/407; 358/448; 370/323; 379/93.07; 379/207; 379/209; 379/211; 379/98; 379/93

(58) Field of Classification Search ........... 358/400, 358/403, 404, 405, 407, 448, 1.15; 379/93.07, 379/207, 209, 211, 98, 93; 370/323
See application file for complete search history.

(56) References Cited

U.S. PATENT DOCUMENTS

| | | | | |
|---|---|---|---|---|
| 5,517,556 | A * | 5/1996 | Pounds et al. | 379/88.25 |
| 5,668,857 | A * | 9/1997 | McHale | 379/93.07 |
| 5,703,940 | A * | 12/1997 | Sattar et al. | 379/201.05 |
| 5,892,591 | A * | 4/1999 | Anglin et al. | 358/407 |
| 5,893,591 | A * | 4/1999 | Ebel et al. | 285/354 |
| 5,999,565 | A | 12/1999 | Locklear et al. | |
| 6,005,677 | A * | 12/1999 | Suzuki | 358/442 |
| 6,028,679 | A * | 2/2000 | Murphy | 358/407 |
| 6,046,824 | A * | 4/2000 | Barak | 358/400 |
| 6,317,597 | B1 * | 11/2001 | Baker et al. | 455/426.1 |
| 6,438,105 | B1 * | 8/2002 | Qarni et al. | 370/231 |
| 6,487,197 | B1 * | 11/2002 | Elliott | 370/354 |
| 6,795,408 | B1 * | 9/2004 | Hiett | 370/323 |
| 6,904,038 | B1 * | 6/2005 | Moon et al. | 370/353 |
| 2002/0114346 | A1 * | 8/2002 | Lampe et al. | 370/465 |
| 2004/0100648 | A1 * | 5/2004 | Kulakowski | 358/1.13 |

OTHER PUBLICATIONS

Sieloff, J., "Standard Irons Wrinkles Out of IP Fax", NetworkWorldFusion (Dec. 6, 1999), avaliable on Aug. 7, 2000 at (http://www.nwfusion.com/news/tech/1206tech.html).
ITU-T Recommendation T.37, "Procedures for the Transfer of Facsimile Data Via Store-and-Forward on the Internet", Previously CCIT Recommendation T.37 (Jun. 1998).
U.S. Appl. No. 11/496,705, filed Jul. 31, 2006, Rollins.

* cited by examiner

*Primary Examiner*—Twyler L. Haskins
*Assistant Examiner*—Michael Burleson
(74) *Attorney, Agent, or Firm*—Knobbe, Martens, Olson & Bear, LLP

(57) ABSTRACT

A method and system for communicating a facsimile (fax) message over a computer network. A user initiates the sending of the fax to a recipient fax transceiver located outside the user's local-toll area of a Public Switched Telephone Network (PSTN). A first fax transceiver transmits the fax to a first server, wherein the first fax transceiver and the first server both are located in the same local-toll area. The first server then transmits the fax via the Internet to a second server, which is located in the same local-toll area as the recipient fax transceiver. The second server, having an inbound, dial-up access modem pool, is configured to process and transmit the fax via the local PSTN to the recipient fax transceiver.

17 Claims, 4 Drawing Sheets

METHOD AND SYSTEM FOR FACSIMILE DELIVERY USING DIAL-UP MODEM POOLS

BACKGROUND OF THE INVENTION

1. Field of the Invention

The invention relates generally to Internet Protocol telephony, and more particularly to a system and a method for utilizing inbound, dial-up modem pools to deliver store-and-forward facsimiles.

2. Description of the Related Art

The transmission of a facsimile (fax), from one fax machine to another, using the Public Switched Telephone Network (PSTN) is a common activity. Studies suggest that an average Fortune 500 company incurs a cost of about $15 million each year for sending faxes over the PSTN. Additionally, reports estimate that the worldwide, long-distance fax bill in 1997 amounted to $30 billion. However, the use of the Internet can significantly reduce the cost of long-distance faxing. The Internet is the well-known electronic communications network that connects computer networks around the world. The savings in the cost of long-distance faxing are realized by using the Internet for transmittal over the long-distance portion of the route, and using the PSTN only to complete the transmission locally.

With the adoption of international standards, high quality faxing via the Internet has become a reality. A significant development has been the adoption of the standard for transferring fax data via the Internet using the "store-and-forward protocol," i.e., the T.37 standard of the International Telecommunication Union. The T.37 standard allows the commingling of corporate and fax-service-provider equipment and networks to provide local fax server coverage anywhere in the world. One aspect of the T.37 standard is that, unlike real-time faxing, delivery of a store-and-forward fax can be delayed until a transmission line becomes available.

Generally, Internet Service Providers (ISPs) make available the hardware and software needed for accessing the Internet. One typical manner of accessing the Internet is known as dial-up access. Dial-up access refers to connecting a device (e.g., a personal computer) to a computer network (e.g., the Internet) via a modem that accesses the Internet through a public telephone network. In order to meet surging demand for access to the Internet, ISPs have invested substantial amounts of capital in "dial-up modem pools." A modem pool typically includes a group of modems that is shared by the ISP's subscribers. Generally, an end user connects to a dial-up modem pool of the ISP, then the ISP connects the end user to the Internet. However, the recent emergence of other links, such as broadband, Internet-access technology, is threatening to make existing local dial-up modem pools obsolete, or at least largely underutilized.

There is, thus, a need for a method of and a system for implementing the "store-and-forward" protocol utilizing the inbound, dial-up modem pools of ISPs.

SUMMARY OF THE INVENTION

The invention, in its different embodiments, utilizes ISP's dial-up modems to reduce the cost of long-distance faxing. In one embodiment, the invention provides a method of communicating a fax message via a computer network. The method comprises receiving the fax message by a server having at least one dial-up modem, determining availability of the dial-up modem, and sending the fax message via the dialup modem to a receiver.

In another embodiment, the invention provides a method of communicating a fax message via a computer network. The method comprises transmitting a fax from a first fax transceiver to a first server and forwarding of the fax by the first server, via a computer network, to a second server having a plurality of dial-up modems. The method further comprises receiving and storing the fax at the second server and determining availability of each of the dial-up modems. The method further comprises queuing transmission of the fax for a period of time, and determining availability of each of the dial-up modems upon expiration of the time period, if none of the dial-up modems is available. The method further comprises sending the fax via a selected one of the dial-up modems, determined to be available, to a second fax transceiver, wherein the second fax transceiver is physically located in the same local-toll area, of a public telephone network, as the second server.

Another embodiment of the invention provides a system for communicating a fax message via a computer network. The system includes a server, in communication with the computer network, that is configured to receive the fax message. The system further includes at least one dial-up modem, in communication with the server, configured to send the fax message to a receiver. The system further includes a communication link for delivery of the fax message to the receiver.

Yet another embodiment of the invention provides a system for communicating a store-and-forward fax message via a computer network. The system comprises a server, in communication with the computer network, that is configured to receive the fax message. The system further comprises a plurality of dial-up modems, in communication with the server, configured to send the fax message to a receiver. The system further comprises a module executing in the server for processing the fax, wherein processing the fax includes storing the fax in a memory, determining the availability of the each dial-up modem in the plurality dial-up modems, queuing the fax for later delivery if none of the dial-up modems is available, and sending the fax message via one of the dial-up modems to a receiver. The system further includes a communication link for delivery of the fax message to the receiver.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

The following description should not be taken in a limiting sense, but is made merely for the purpose of describing the general principles of the invention. The scope of the invention should be determined with reference to the claims.

Figure 1:
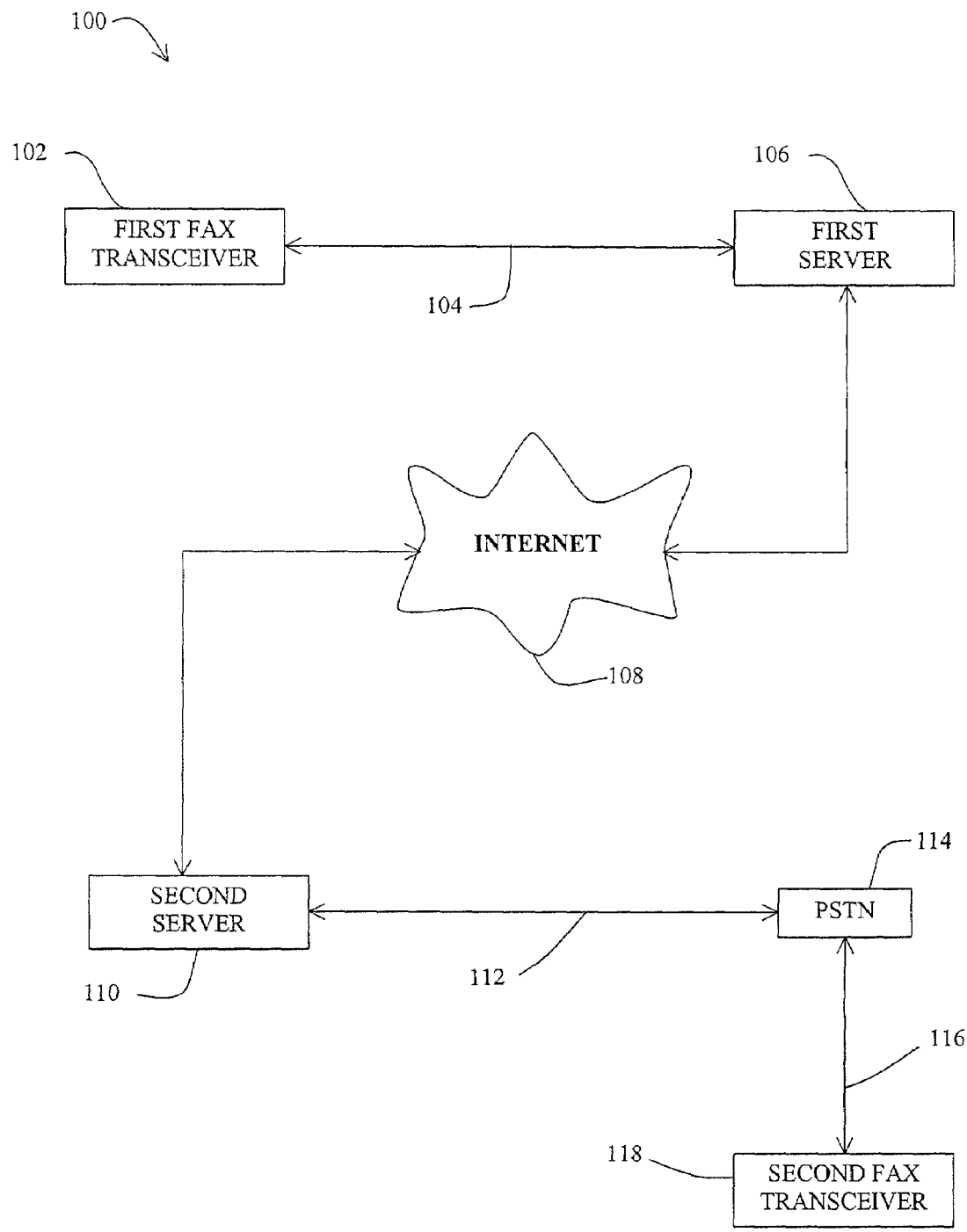
FIG. 1 is a network diagram illustrating facsimile transmission over the Internet.

Taking advantage of the store-and-forward protocol, the invention advantageously utilizes inbound, dial-up modem pools to transmit faxes in a cost efficient manner; this result is obtained because ISPs may deliver faxes during nonpeak (i.e., idle) hours of dial-up use of the modem pools. FIG. 1 shows a network 100 that is configured to provide facsimile (fax) transmission over the Internet 108. The network 100 typically comprises a first fax transceiver 102 connected to a first server 106 via a communication link 104. The first fax transceiver 102 may be, for example, a conventional fax machine or a computer with fax capabilities. The communication link 104 may comprise any link (e.g., PSTN dial up, ISDN, xDSL, etc.) that is commonly used to connect to computer networks, such as the Internet 108. The first server 106 is typically a processor based computing device that is programmed with instructions to receive fax transmissions from the first fax transceiver 102.

The network 100 further comprises a second server 110, which can be accessed by the first server 106 via the Internet 108. Similar to the first server 106, the second server 110 is also a processor based device; however the second server 110 includes a group of dial-up, in-bound modems (shown in FIG. 2). Both the first server 106 and the second server 110 are connected to the Internet 108 in a manner well known in the pertinent technology.

The network 100 further comprises a first communication link 112 that connects the second server 110 to the Public Switched Telephone Network (PSTN) 114, which in turn is connected to a second fax transceiver 118 via a second communication link 116. The first communication link 112 may be a conventional telephone link or a wireless telephone link. The second communication link 116 may be any well known communication link (e.g., conventional telephone link, fiber optic link, wireless link, etc.) for connecting networks or communication devices. The Internet 108 and the PSTN 114, or their equivalents, are well known in the pertinent technology.

In operation of the network 100, the first fax transceiver 102 transmits a fax over the communication link 104 to a first server 106, which is located within the same local-toll area as the first fax transceiver 102. The first server 106 then communicates the fax, via the Internet 108, to the second server 110. In one embodiment of the invention, the first server 106 communicates the fax to the second server 100 using the "store-and-forward" protocol, i.e., the T.37 standard of the International Telecommunications Union. However, it will be readily apparent to a person of ordinary skill in the pertinent technology that other protocols allowing for delayed transmission of a fax over the Internet 108 are equivalent to the T.37 standard for the purposes of implementing the present invention. The second server 110 is located within the same local-toll area of the PSTN as the second fax transceiver 118. The second server 110 includes an attached modem pool (shown in FIG. 2), such as that used for conventional dial-up access to the Internet. When the fax arrives at the second server 110, as will be described with reference to FIG. 3 and FIG. 4, the second server 110 processes and transmits the fax to the second fax transceiver 118 via the PSTN 114.

Figure 2:
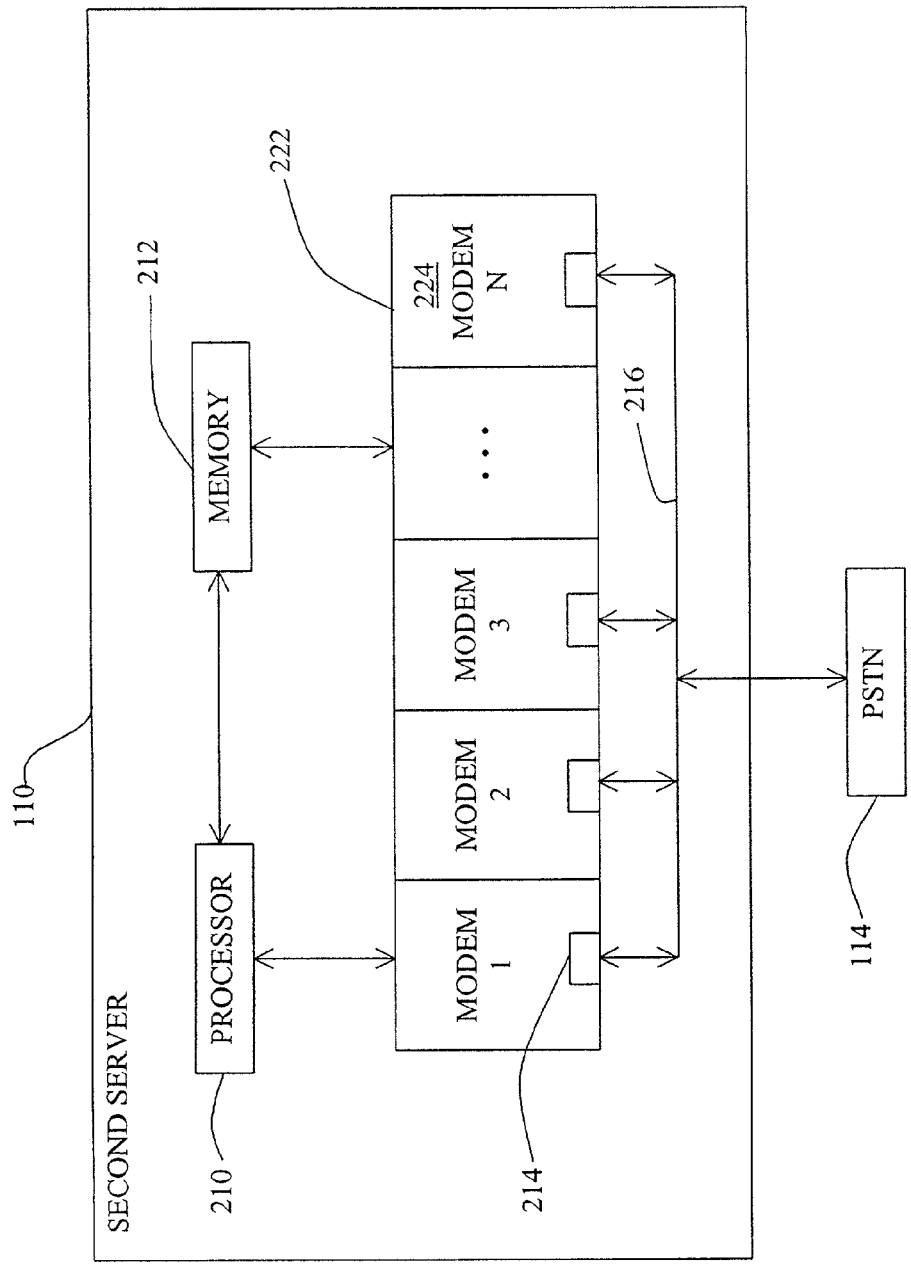
FIG. 2 is an exemplary block diagram of a network server in accordance with one embodiment of the invention.

FIG. 2 is an exemplary block diagram of the second server 110 according to one embodiment of the invention. The second server 110 comprises a processor 210 in communication with at least one modem 224 as well as a memory 212. The processor 210 may comprise any commercially available processor, such as a Pentium Pro, any processor in the 680×0 family of processors manufactured by Motorola, etc. Typically, the second server 110 includes several units of the modem 224, which collectively are referred to as a modem pool 222. Each modem 224 has an input/output port 214. The modem 224 may be a dial-up modem, such as a 28 or 56 KBPS modem, which is connected to the Internet 108 and to the PSTN 114. The memory 212, conventionally connected to the processor 210 and the modem 224, may be in the form of a cache memory for rapid access to the cached (i.e., stored) information, or other type of memory, such as a dedicated hard disk.

Figure 3:
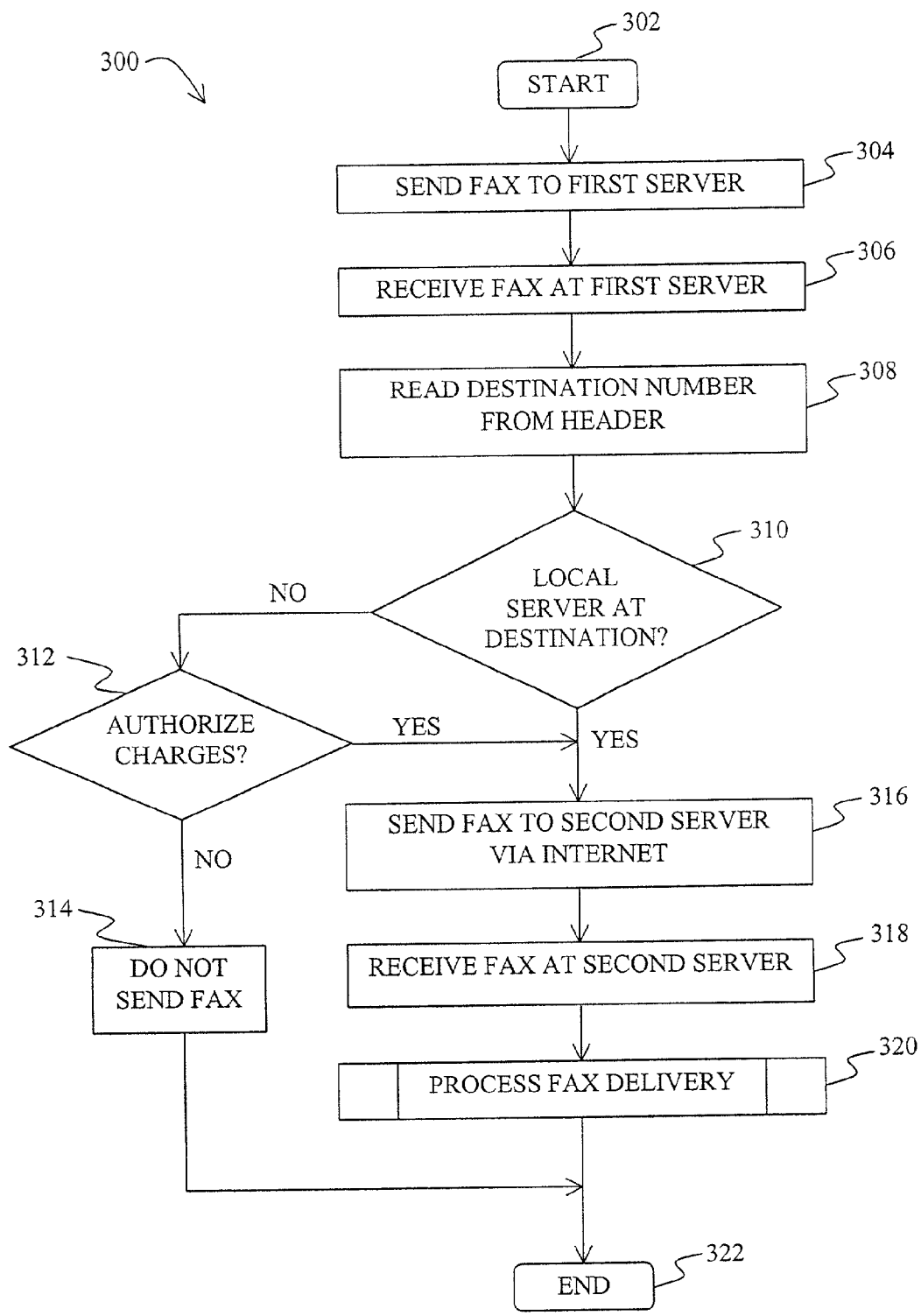
FIG. 3 is a flowchart illustrating the process of communicating a facsimile in accordance with one embodiment of the invention.

The process of communicating a fax in accordance with one embodiment of the invention will now be explained by reference to FIG. 3. FIG. 3 is a flowchart of the process of communicating a fax in accordance with one embodiment of the invention. The process 300 starts at block 302 when a user submits a fax to the first fax transceiver 102 for delivery. At block 304, the first fax transceiver 102 sends a fax to the first server 106, which is typically located in the same local-toll area of the PSTN as the first fax transceiver 102. The first server 106 then receives the fax at block 306. At block 308, the first server 106 reads a destination number from the header of the fax. The destination number is typically the fax number of the intended recipient fax machine. At decision block 310, using the destination number, the first server 106 determines whether there is a second server 110 in the local-toll area of the second fax transceiver 118. If that is not the case, in decision block 312 the first server 106 queries whether the user has authorized long-distance charges for the fax transmission. This may be done for example by informing the user that long-distance charges apply, and receiving input from the user as to whether the user authorizes the charges or not. If it is determined in block 312 that the user has not authorized such charges, the system proceeds to block 314 wherein a flag is set indicating that the fax was not sent by the server 106. The process 300 then moves to block 322 where it ends. If, however, it is determined in block 310 that there is a second server 110 in the local-toll area of the second fax transceiver 118, or in block 312 that the user does authorize long-distance charges, the process moves to a block 316 wherein the first server 106 sends the fax to the second server 110 via the Internet 108. At block 318, the second server 110 receives the fax, and stores it in the memory 212. The process 300 then moves to a block 320 wherein the second server 110 processes the fax for delivery in a manner described in greater detail with reference to FIG. 4. After the second server 110 delivers the fax, the process 300 ends at block 322.

Figure 4:
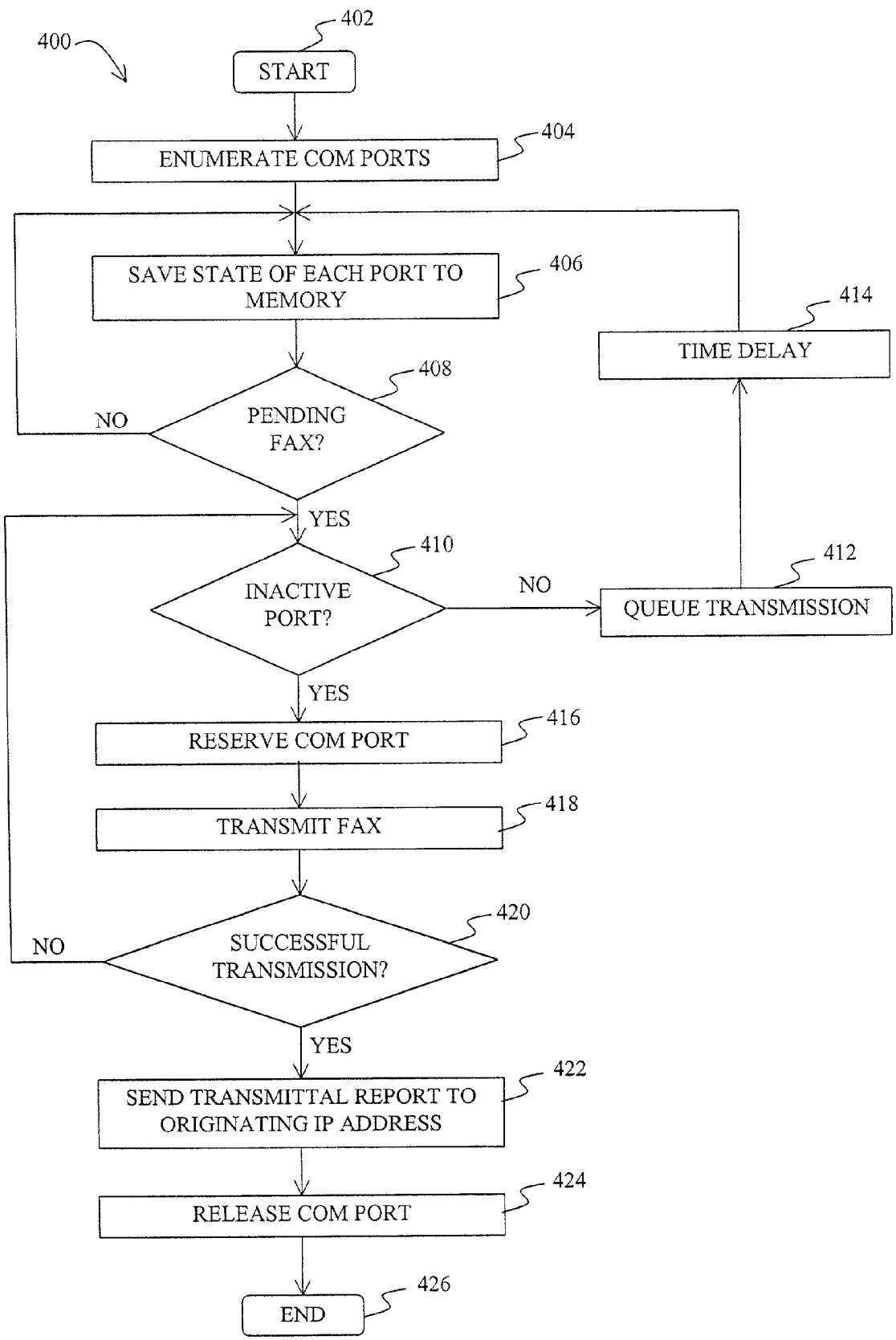
FIG. 4 is a flowchart illustrating the process of handling a facsimile at the network server of FIG. 2.

The method of processing the fax for delivery, represented by block 320 in FIG. 3, will now be explained with reference to FIG. 2 and FIG. 4. FIG. 4 is a flowchart illustrating the process of handling a fax at the network server of FIG. 2. In FIG. 4, the process 400 begins at block 402 after the fax has been received at the second server (i.e., block 318 of FIG. 3). The second server 110, at block 404, enumerates each of the input/output ports 214 of the modem pool 222. The process of enumeration refers to counting the number of ports present in the system and noting their active or inactive state. For the purposes of this discussion, if a port is not currently being used to fulfill queries of other users, the port is termed an inactive port (i.e., it is in an inactive state); otherwise the port is called an active port (i.e., it is in an active state). Enumeration may be performed at start-up of the second server 110, after the ports 214 are added or removed, or periodically at predetermined times of the day. Enumeration prevents the second server 110 from attempting to transmit on a failed port and generating an error that then must have a corresponding error handler. At block 406, the active or inactive state of each port is saved to the memory 212.

The process continues to decision block 408, where the second server 110 determines whether there is a pending fax transmission. If there is no pending fax transmission, the process returns to block 406; otherwise, the process continues to decision block 410. At decision block 410, the second server 110 queries whether there is an inactive port 214. If the second server 110 does not find an inactive port 214, the process moves to block 412 wherein the second server 110 queues the fax for transmission at a later time. The second server 110 then, at block 414, starts a timing loop that will run for a predetermined amount of time or counts, i.e., a time delay. The duration of waiting time is appropriately chosen by the system administrator based on, for example, historical data, current or anticipated system loading, or other criteria applicable to the use of the system. For example, during hours of very low use of the modem pool 222, delay time should be minimum. On the other hand, a longer delay time should be chosen when the modem pool 222 is being heavily utilized by dial-up connections. Additionally, in one embodiment the selection of the duration of the delay time of block 414 could is left to the user; or, alternatively, the processor 221 might determine the optimal waiting time using any optimization algorithm that takes into account, for example, the number of ports 214 available and the number of subscribers of the ISP.

After the time delay of block 414 has expired, the process returns to block 406 and proceeds as described above. Alternatively, in another embodiment, after expiration of the time delay the process may return from block 414 to query block 410, since it is already known that a fax is pending for transmission. If it is determined in block 410 that there is an inactive port, the process moves to block 416 where the second server 110 reserves the inactive port for the transmission of the pending fax; this changes the port status from inactive to active, i.e., from idle to busy. At block 418, the second server 110 transmits the fax via the reserved port 214. The details of such transmission are well known in the relevant technology. If long-distance charges apply, the charges may be stored in the memory 212 for later accounting or billing to the user. At decision block 420, the second server 110 queries whether the transmission was successful. If the transmission was not successful, the process returns to the decision block 410 and proceeds as previously described. If it is determined in block 420 that the transmission was successful, the process moves to block 422 wherein the second server 110 sends a transmittal report to the first fax transceiver 102. Having completed delivery of the fax, at block 424 the second server 110 releases the input/output port 214; this action changes the state of the port 214 from active to inactive. The process then terminates at block 426.

In view of the foregoing, it will be appreciated that the invention provides a process by which available capacity of dial-up modem pools can be used in providing a low cost system for transmission of signals between distant fax transceivers. The invention may be embodied in other specific forms without departing from its spirit or essential characteristics. The described embodiment is to be considered in all respects only illustrative and not restrictive. The scope of the invention is, therefore, indicated by the appended claims rather than by the foregoing description. All changes that fall within the meaning and range of equivalency of the claims are to be embraced within their scope.

What is claimed is:

1. A method of communicating a message via a computer network, the method comprising:

providing internet access services to a plurality of subscribers with a target server by receiving with a plurality of modems connected to the target server a plurality of in-bound requests from the subscribers for access to the Internet, wherein the target server is located within a same local-toll area of a public switched telephone network as a target transceiver, and wherein the target transceiver is different than the subscribers sending in-bound requests to the target server;

receiving at the target server a message originated by a sender transceiver and communicated to the target server by a sending server wherein the sending server receives the message from the sender transceiver with an inbound communication, and wherein the sending server communicates the message to the target server via the Internet, wherein the message is directed to the target transceiver by the target server, and wherein the messages are to be sent as outbound facsimile transmissions from the target server to the target transceiver, and wherein the modems that receive the in-bound requests for access to the Internet from the subscribers are further configured to transmit the message as a facsimile transmission from the target server to the target transceiver via the public switched telephone network;

determining with a processor whether one or more modem ports at the target server is inactive such that at least one of the modem ports is not receiving in-bound requests for Internet access from one or more of the subscribers;

if none of the modem ports are inactive, applying a variable wait time at the target server, wherein a duration of the variable wait time is applied based at least in part on historical data, based at least in part on the number of modems, and based at least in part on the number of subscribers;

after the variable wait time, determining with the target server whether one or more of the modem ports is inactive;

sending the message as an outgoing facsimile transmission via an available modem and the public switched telephone network from the target server to the target transceiver if at least one of the modem ports is inactive;

and sending a confirmation via the internet from the target server to the sending server confirming the sending of the message as a facsimile transmission to the target transceiver.

2. The method of claim 1, further comprising storing the message at the target server.

3. The method of claim 1, further comprising reserving an available modem for transmitting the message to the target transceiver.

4. The method of claim 1, wherein determining whether one or more of the modem ports is inactive is performed periodically at predetermined times, or at start-up of the target server, or after one of the modems is removed or another of the modems is added.

5. The method of claim 1, further comprising saving an active state of one or more of the modems in a memory.

6. The method of claim 1, further comprising queuing the message for sending at a later time if there is no modem available for immediate sending.

7. The method of claim 1, wherein the variable wait time is based upon at least one characteristic of the load upon the modems.

8. The method of claim 1, further comprising sending a transmittal report to a transceiver having originated the message.

9. The method of claim 1, further comprising receiving the message, wherein receiving the message includes handling the message according to the T.37 standard.

10. A system for communicating a message via a computer network, the system comprising:

a target server that provides Internet access services to a plurality of subscribers, wherein the target server has a plurality of modems associated therewith that receive in-bound requests from the subscribers for internet access services and wherein the target server and a target transceiver are located within a same local-toll area of a public switched telephone network connected to the target server and the target transceiver;

wherein the target server is configured to receive a message originated by a sender transceiver and communicated to the target server from a sending server wherein the sending server receives the message from the sender transceiver with an inbound communication, and wherein the sending server communicates the message to the target server via the Internet wherein the target server is further configured send the message as an outgoing facsimile transmission to the target transceiver via the public switched telephone network;

wherein the target server determines whether one or more of the modems at the target server is inactive, such that one or more of the modems is not in communication with one or more of the subscribers; wherein the target server is configured to apply a variable wait time when the one or more of the modems is not inactive, wherein a determined duration of the variable wait time is variably applied based at least in part on historical data and based at least in part on the utilization of the modems;

wherein the target server is configured to determine whether at least one of the modems is inactive after the variable wait time; and wherein the target server is configured to send the message as an outgoing facsimile transmission to the target transceiver via the modem and the public switched telephone network.

11. The system of claim 10, wherein the target server is further configured to store the message at the target server.

12. The system of claim 10, wherein the target server is further configured to reserve a modem for transmitting the message to the recipient.

13. The system of claim 10, wherein the target server is configured to queue the message for sending at a later time if there is no modem available for immediate sending.

14. A method of communicating a message via a computer network, the method comprising:

receiving a message from a first transceiver and a first server at a second server, wherein the message is communicated to a second server by the first server wherein the first server receives the message from the first transceiver with an inbound communication, and wherein the second server an a second transceiver are located within a same local-toll area of a public switched telephone network and wherein the public switched telephone network is connected to the second server and to the second transceiver;

providing internet access services with the second server to a plurality of subscribers with a plurality of modems connected to the target server, wherein the modems receive a plurality of in-bound requests from the subscribers for access to the Internet, and wherein the modems are configured to communicate the message to recipients via the public switched telephone network;

receiving the message from the first server and storing the message at the second server;

determining whether one or more of the modems at the second server are inactive such that at least one of the modems is not in communication with one or more of the subscribers;

determining and applying a variable wait time when modems are not inactive, wherein the duration of the variable wait time is applied based at least in part on historical data and based at least in part on a number of the modems;

determining availability of the modems after the variable wait time; and if one of the modems is available after the variable wait time, sending the message via an available one of the modems and the public switched telephone network to the second transceiver.

15. The method of claim 14, wherein receiving and storing includes processing the message according to a store-and-forward protocol.

16. The method of claim 14, further comprising reserving an available modem for sending the message.

17. The method of claim 14, further comprising queuing the transmission of the message, wherein queuing transmission of the message includes the variable wait time and wherein the variable wait time is further based upon at least one characteristic of the load upon the modems.

* * * * *

UNITED STATES PATENT AND TRADEMARK OFFICE
CERTIFICATE OF CORRECTION

| | | |
|---|---|---|
| PATENT NO. | : 7,605,934 B2 | Page 1 of 1 |
| APPLICATION NO. | : 09/840548 | |
| DATED | : October 20, 2009 | |
| INVENTOR(S) | : Doug Rollins | |

It is certified that error appears in the above-identified patent and that said Letters Patent is hereby corrected as shown below:

On the title page, item (56), under "Other Publications", in column 2, line 2, delete "avaliable" and insert -- available --, therefor.

In column 8, line 3, in Claim 14, delete "an a" and insert -- and a --, therefor.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,605,934 B2  Page 1 of 1
APPLICATION NO. : 09/840548
DATED : October 20, 2009
INVENTOR(S) : Doug Rollins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Fifth Day of October, 2010

David J. Kappos
*Director of the United States Patent and Trademark Office*